United States Patent [19]

Capron et al.

[11] Patent Number: 4,993,125
[45] Date of Patent: Feb. 19, 1991

[54] CONTAINER CONNECTOR

[75] Inventors: Mark E. Capron, Oxnard; Craig Sarsfield, Ojai; Bradley Posadas, Oxnard, all of Calif.

[73] Assignee: United States of America as represented by the Secretary of the Navy, Washington, D.C.

[21] Appl. No.: 481,923

[22] Filed: Feb. 20, 1990

[51] Int. Cl.⁵ .............................................. A44B 21/00
[52] U.S. Cl. ........................................ 24/287; 410/77; 410/82
[58] Field of Search .................... 24/287, 290, 295; 410/77, 78, 79, 84, 94; 220/1.5, 23.4, 23.6

[56] References Cited

U.S. PATENT DOCUMENTS

| | | |
|---|---|---|
| 3,083,670 | 4/1963 | Harlander et al. |
| 3,389,663 | 6/1968 | Gutridge |
| 3,556,456 | 1/1971 | Lunde .................................. 248/361 |
| 3,683,463 | 8/1972 | Siefer et al. ........................... 24/287 |
| 3,752,511 | 8/1973 | Racy ..................................... 287/2 |
| 4,626,155 | 12/1986 | Hlinsky et al. ......................... 410/82 |
| 4,648,764 | 3/1987 | Pavlick .................................. 410/77 |
| 4,697,967 | 10/1987 | Schulz et al. ....................... 410/77 X |
| 4,856,150 | 8/1989 | Johnson ............................... 24/287 |

FOREIGN PATENT DOCUMENTS 1430991  4/1976  United Kingdom .................. 410/82

Primary Examiner—Robert J. Spar
Assistant Examiner—Craig Slavin
Attorney, Agent, or Firm—Ron Billi

[57] ABSTRACT

This invention relates to a container connector having independently adjustable and locking ends, each end configured to be inserted into an opening of a cargo container and rotated to lock the connector with the container. When inserted and locked the connector holds two adjacent ends of adjacent containers in a spaced relationship. Locking mechanisms are provided for retaining each locking end in the locked or unlocked position. The ends of the connector may be adjusted to accommodate containers with different end spacing requirements.

3 Claims, 3 Drawing Sheets

CONTAINER CONNECTOR

BACKGROUND OF THE INVENTION

The present invention relates to connectors for holding together large shipping containers. These containers are used for transporting various cargo items primarily by ship and/or truck. The containers are approximately eight feet high and eight feet wide with a standard length of twenty feet. However, containers with shorter than twenty foot lengths are available in, for example, ten foot and five foot lengths and are appropriately called half and quarter length containers respectively.

Shipping containers enjoy a minimum cost per cubic foot if the container is the standard twenty foot INTERNATIONAL ORGANIZATION FOR STANDARDS (ISO) length since ship and truck handling and storage equipment are designed to handle the "standard" twenty foot length. Therefore, it is desirable to join non-standard length containers to form a single unit of twenty foot length.

Container connectors have been utilized to fasten and hold together containers and have taken on many forms. One such device that has been utilized in the past is found in U.S. Pat. No. 3,389,663 to Gutridge which utilizes a collection of non-standard parts and includes two mechanically activated non-independent heads for connecting containers. A somewhat similar device is found in U.S. Pat. No. 3,752,511 to Racy and a highly complex version is found in U.S. Pat. No. 3,556,456 to Lunde. Yet all of these devices fail to provide an inexpensive, simple, safe to operate device with independently operable and adjustable locking heads that can be operated with standard hand tools.

SUMMARY OF THE INVENTION

The present invention fastens and holds together the adjacent ends of shipping containers so that the resultant container is the "standard" twenty foot length.

Each of the eight corners of a shipping container includes a hollow corner block with elongated circular openings formed in the three outward facing sides of each corner block. When it is desired to join 2 containers, the end of a first container is aligned with the end of a second container and the two containers are connected and held together in a spaced relationship by means of container connectors positioned at each corner.

Accordingly, the container connector of the present invention includes a first and second locking end, the first locking end being "fixed" or integral with a threaded shaft and the second locking end being rotatable about said threaded shaft. Each locking end is operable independently of the other and can be locked or unlocked with standard hand tools. Each locking end includes a nut, washer, journal and head all joined, as by welding, to form a single piece. A rotatable spacer is located over the journal and between the washer and the head. The first and second locking ends are identical except that the first locking end is integral with the threaded shaft and the second locking end rotatably communicates with the threaded shaft. Both first and second locking ends contain positioning means comprising a spring and ball detent mechanism to maintain the locking ends in a locked or unlocked position.

In operation, one end of each container connector is first inserted and rotatably locked into a corner block opening of a first container. In the "locked" position, the container connector grips the corner block and is rigidly held in place without the need for human assistance. The second end of each container connector is then rotatably positioned in the unlocked mode ready to receive the corner block opening of a second container. The second container is then positioned and aligned so that the corner block openings of the second container communicate with the container connectors previously locked in the first container. The second end of each container connector is then rotatably locked, joining and holding together the two containers in a spaced relationship.

DETAILED DESCRIPTION OF THE PREFERRED EMBODIMENT

Figure 1:
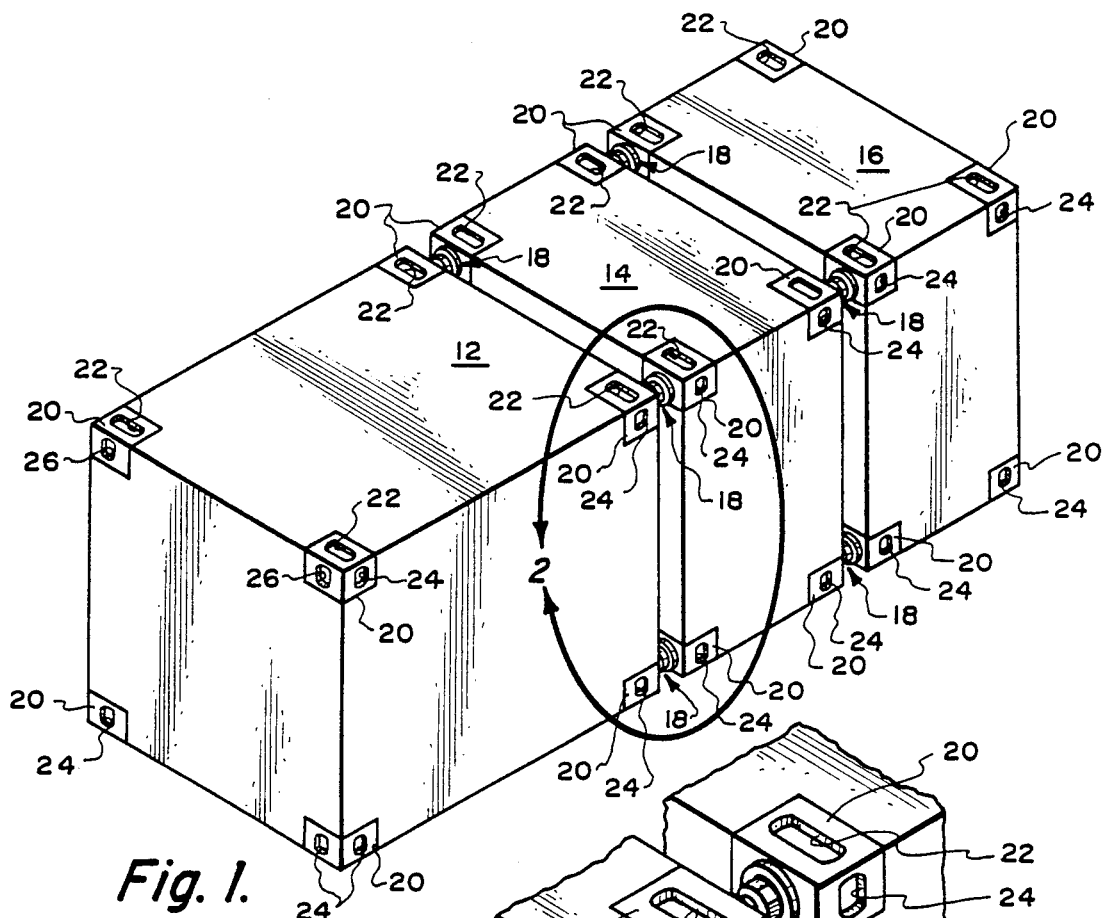
FIG. 1 is a perspective view of three aligned and joined cargo containers showing corner blocks in each corner and container connectors connecting aligned ends.

As shown in FIG. 1, cargo containers 12, 14 and 16 are shown with their ends in aligned configuration and joined and held together by container connectors 18. As can be seen, all containers are approximately eight feet high and eight feet wide but the length of each container may vary as, for example, in FIG. 1 container 12 is approximately ten feet long and containers 14 and 16 are approximately five feet long. The joining of any number of containers is desirable to form a resultant joined unit of approximately twenty feet in length to maximize the handling efficiency and therefore minimize the dollar cost per cubic foot.

Each cargo container is constructed to include a hollow corner block 20 located in each corner of a cargo container. Corner blocks 20 have three outwardly facing surfaces, each containing an opening approximately rectangular in shape with curved ends. Top and bottom facing openings 22 are approximately 5 inches by 2 inches. Side and bottom end facing openings 24 are approximately 3¼ inches by 2 inches. Top end facing openings 26 are approximately 3¼ inches by 2½ inches. Corner blocks 20 are typically fabricated from steel and have a wall thickness of approximately ¾ inches.

Figure 2:
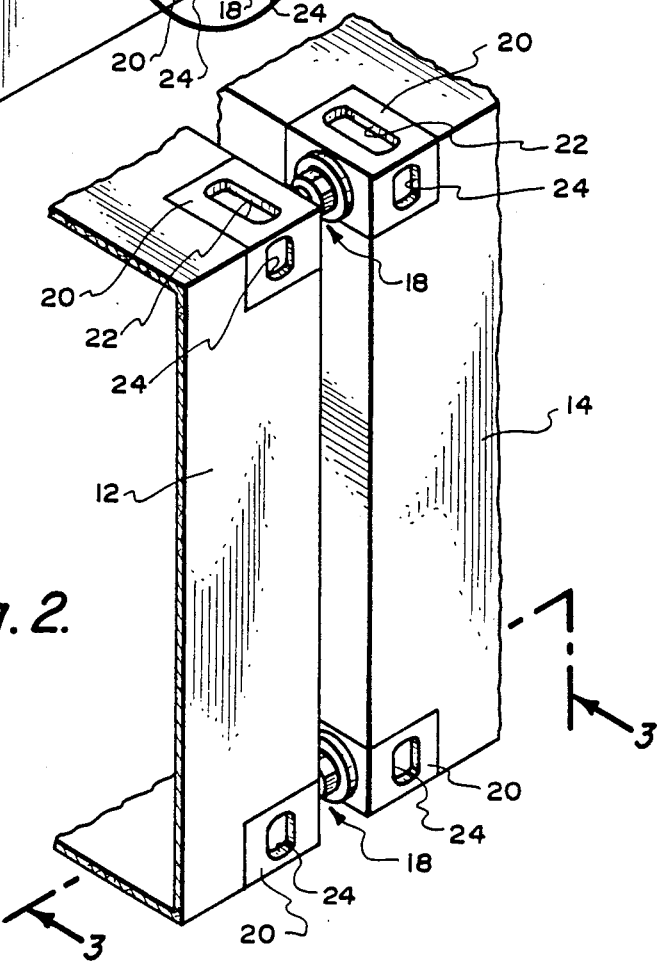
FIG. 2 is an enlarged sectional view taken on line 2 of FIG. 1 showing the openings in the corner blocks.
Figure 3:
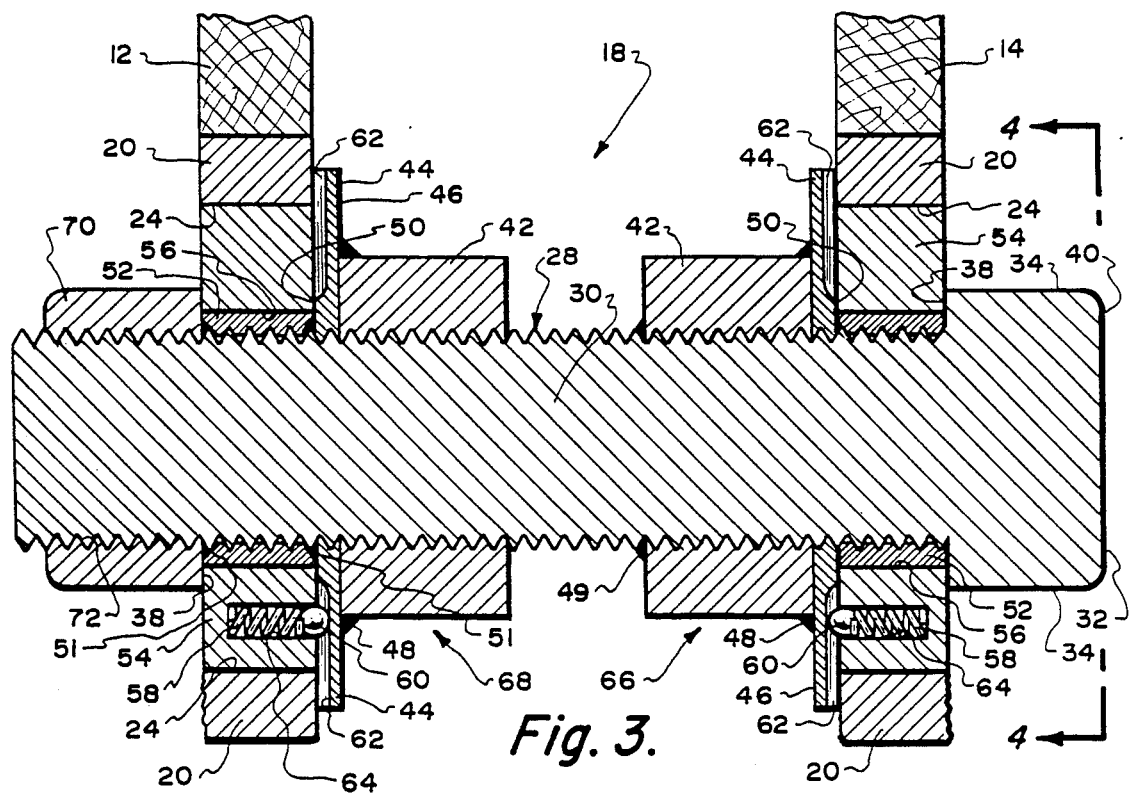
FIG. 3 is an enlarged cross-sectional view taken along line 3—3 of FIG. 2.
Figure 4:
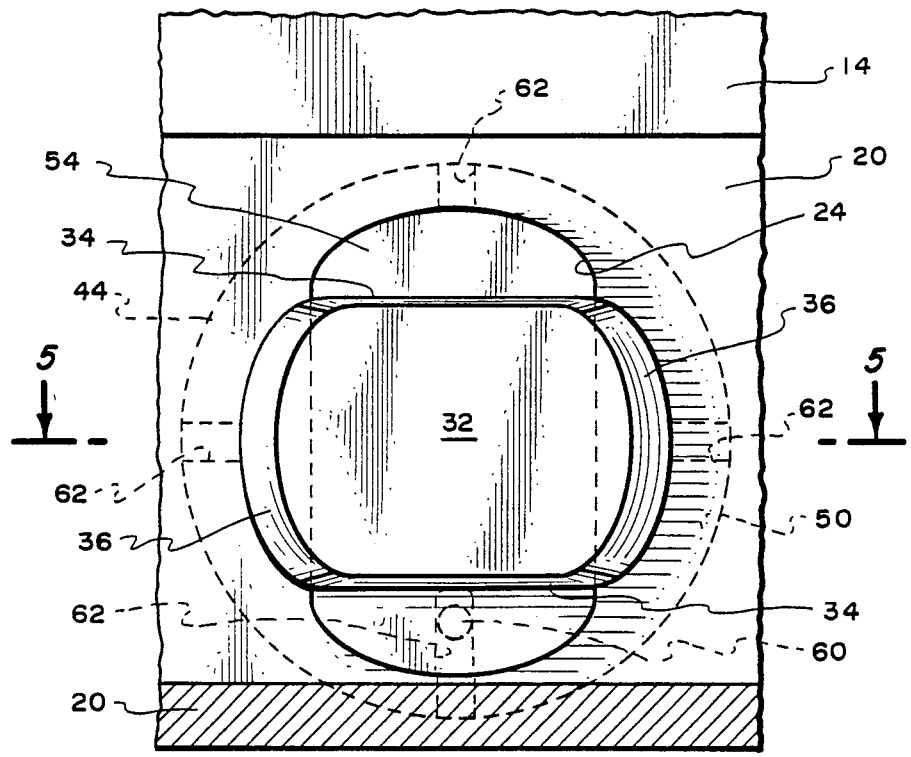
FIG. 4 is an end view taken along line 4—4 of FIG. 3 showing the rotating end of the invention.
Figure 5:
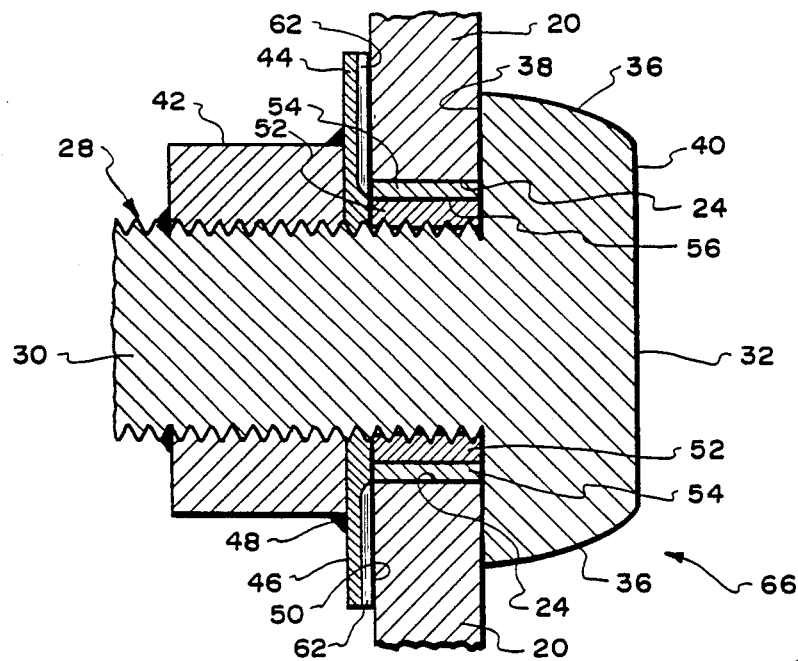
FIG. 5 is a cross sectional view taken along line 5—5 of FIG. 4 showing the connector of the present invention joining and holding together one corner of two aligned containers.
Figure 6:
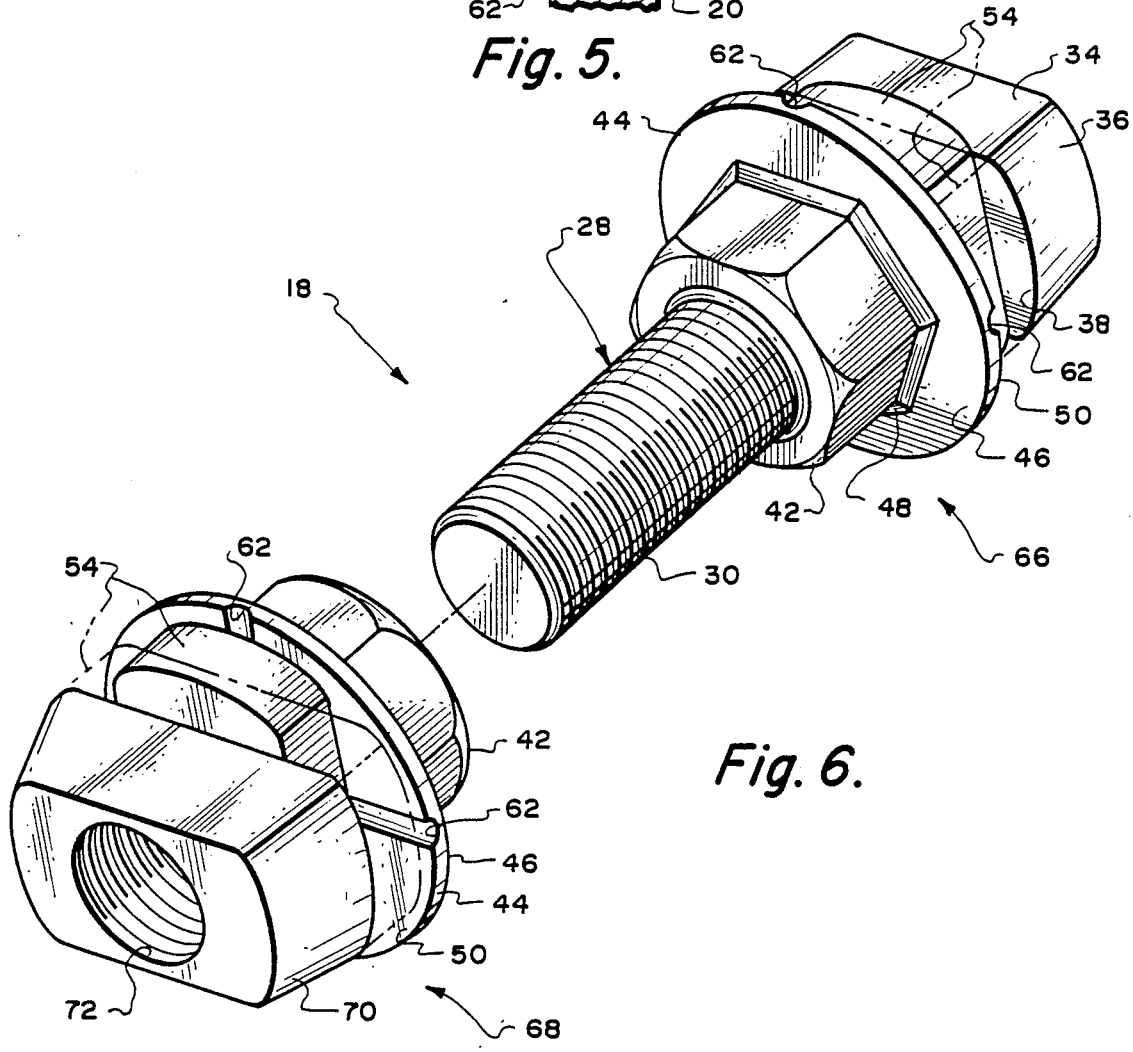
FIG. 6 is a perspective view of the connector of the present invention.

Connector 18 is shown in detail in FIG. 3. Thru piece 28 has a shape that approximates a large bolt and includes solid threaded shaft 30 and head 32 and has an overall length of approximately 7⅜ inches. Threaded shaft 30 is approximately 6¼ inches long and has external 1 5/16 by 6 threads per inch along its entire length. Head 32 is approximately 1⅛ inches thick and is shaped with straight side 34 and compound curved ends 36 (see FIG. 3 and FIG. 4). When viewed from the end as shown in FIG. 4, head 32 is shaped and sized to provide a clearance fit when inserted in corner block opening 24. As can be seen, the larger that head 32 is, the stronger the connection will be since the interface between the flat gripping surface 38 of head 32 and the container is maximized. When viewed from the side, as in FIG. 5, compound curved ends 36 taper from a larger diameter adjacent surface 38 to a smaller diameter adjacent end surface 40, such taper facilitating the insertion of head 32 into openings 24 or 26. Nut 42 may be a standard hardware item approximately 1¼ inches wide with 1 5/16 by 6 internal threads and including 6 external flat surfaces to allow the use of standard wrenches. Washer 44 is approximately 3/16 inch thick and 3½ inches in diameter and is abutably fixed on a first side 46 to nut 42 by means such as filet weld 48. Nut 42 is permanently attached to threaded shaft 30 by means such as filet weld 49. Tubular journal 52 is ¾ inches wide and has an outside diameter of approximately 1¾ inches and a threaded inside diameter that communicates with threaded shaft 30. Spacer 54 is approximately ¾ inch wide and has an internal bore 56 with a diameter of approximately 1¾ inches. The shape of the outer circumference of spacer 54 is the same as head 32 (see FIG. 4) and corner block opening 24 (see FIGS. 2 and 4) and must provide a clearance fit so that spacer 54 may be slidably inserted into corner block opening 24. When assembled, thru piece 28, nut 42 and washer 44 are permanently fixed, as by welding, to form a single piece. Spacer 54, however, may independently rotate around journal 52, the rotation being controlled at ninety degree intervals by a spring activated ball and detent mechanism. As shown in FIG. 3., helical spring 58 is retained in bore 64 in a compressed state, the stored energy of the compressed spring acting on ball 60 in such a manner as to cause ball 60 to be pressed against second side 50 of washer 44. As can be seen in FIG. 4, detents 62 are located at ninety degree intervals on second side 50 of washer 44 and are positioned radially so that ball 60 is caused to be urged into detents 62 when spacer 54 and washer 44 are in the "locked" or "unlocked" position and ball 60 and one detent 62 are aligned. Two opposing detents are used to retain head 32 in the "locked" position (see FIGS. 4 and 6) and the other two detents are used to retain head 32 in the "unlocked" position (see FIG. 6 in phantom). In the preferred embodiment, detents 62 are approximately ¼ inch wide, 3/16 inch deep and ¾ inch long; ball 60 is approximately ¼ inch in diameter and bore 64 is approximately ¼ inch in diameter and ½ inch deep. It should be noted that the container connector is fabricated from steel, such as SAE 4130.

The mechanism thus described forms first locking end 66 of connector 18 (see FIG. 6) and is fixed to and integral with threaded shaft 30. Thus when head 32 rotates, threaded shaft 30 must also rotate. Second locking end 68 of connector 18, however, is not integral with threaded shaft 30. That is, second locking end 68 may be rotated and/or locked without rotating threaded shaft 30. Second locking end 68 differs from first locking end 66 in that rotating head 70 (see FIGS. 3 and 6) is not integral with threaded shaft 30 but instead contains threaded bore 72, the threads being continuous with the internal threads in nut 42 and tubular journal 52. In this way, second locking end 68 may be rotated without rotating threaded shaft 30. In the case of second locking end 68, journal 52 is permanently fixed on one end to second side 50 of washer 44 and on the other end to rotating head 70 by means such as filet welds 51. As a result, first and second locking ends, 66 and 68 respectively, may be independently rotated and thereby adjusted to vary the distance between locking ends when it is desired, for example, to connect containers with different end spacings. The preferred end spacing between containers is approximately 3 inches ± 1/16 inch. In other respects, including numbering of like components, first locking end 66 is substantially similar to second locking end 68 and will not be further described in detail.

When it is desired to join and hold together cargo containers 12 and 14, for example, container connector 18 is made ready by first rotating locking end 66 so that head 32 and spacer 54 are aligned. Locking end 68 is then readied in a similar fashion. Locking end 66 of connector 18 is then inserted into corner block opening 24 or 26 of container 12, for example, and nut 42 is rotated ninety degrees by means of a wrench or by hand thereby locking end 66 of connector 18 in place. Similarly, additional connectors 18 are then readied, inserted and locked into the remaining corner block openings of container 12, so that one end of container 12, for example, contains locked connectors in all four of its end corner block openings. Container 14, for example, is then brought into position and aligned so that the four end corner block openings of container 14 communicate with locking ends 68 of previously inserted and locked connectors 18 fitted into container 12. The two containers are then locked and joined together by rotating ninety degrees second locking end 68 of each connector 18.

Form the foregoing description, it may readily be seen that the subject invention comprises a new, unique, and exceedingly useful container connector which constitutes a considerable improvement over the prior art. Obviously, many modifications and variations of the present invention are possible in light of the above teachings. It is, therefore, to be understood that within the scope of the appended claims, the invention may be practiced otherwise than as specifically described.

What is claimed is:

1. A connector for joining and holding together cargo containers having openings therein comprising:
   a threaded shaft;
   first and second locking ends said first locking end integrally formed with said threaded shaft and said second locking end rotatably connected to said threaded shaft and removable therefrom;
   said first locking end including a fixed head integral with one end of said threaded shaft, a first nut communicating with and affixed to said threaded shaft, a first washer affixed and abutting to said first nut on a first side of said first washer, a first journal communicating with said threaded shaft and abutting on one end a second side of said first washer and on the other end said fixed head and a spacer rotatably located over said first journal and between said second side of said first washer and said fixed head;
   said second locking end including a second nut rotatably communicating with said threaded shaft, a second washer affixed and abutting said second nut on a first side of said second washer, a second journal rotatably communicating with said threaded shaft and affixed on one end to a second side of said second washer, a rotating head pivotally communicating with said threaded shaft and abutting and affixed to a second side of said second journal, a second spacer pivotally located over said second journal and between said second side of said second washer and said rotating head, said second locking end rotatable about said threaded shaft;

means in said first and said second locking ends for locking said first and said second ends in an unlocked or locked position.

2. The connector described in claim 1 wherein said locking means includes a spring located in a bore in said spacer, a ball acted upon by said spring, detents located in said washer and spaced at ninety degree intervals about said washer, said detents configured and located to receive said ball when said locking means is in the locked or unlocked position.

3. The connector described in claim 1 wherein said fixed and said rotating heads and said first and second spacers have an "oval" shape approximating the shape of the opening of the container to which said connectors are attached.

* * * * *